(12) United States Patent
Weissman

(10) Patent No.: US 7,308,085 B2
(45) Date of Patent: Dec. 11, 2007

(54) SERIALIZING AN ASYNCHRONOUS COMMUNICATION

(75) Inventor: Terry R. Weissman, Los Altos Hills, CA (US)

(73) Assignee: Microsoft Corporation, Redmond, WA (US)

(*) Notice: Subject to any disclaimer, the term of this patent is extended or adjusted under 35 U.S.C. 154(b) by 513 days.

(21) Appl. No.: 09/770,067

(22) Filed: Jan. 24, 2001

(65) Prior Publication Data

US 2002/0097841 A1 Jul. 25, 2002

(51) Int. Cl.
*H04M 1/64* (2006.01)
*G06F 15/16* (2006.01)

(52) U.S. Cl. .............. 379/88.23; 379/88.17; 709/217

(58) Field of Classification Search ........... 379/88.04, 379/88.11, 88.22–88.27
See application file for complete search history.

(56) References Cited

U.S. PATENT DOCUMENTS 5,572,576 A * 11/1996 Klausner et al. ......... 379/88.11
5,721,827 A * 2/1998 Logan et al. ............ 709/217
6,970,915 B1 * 11/2005 Partovi et al. ........... 709/217

OTHER PUBLICATIONS

D. Kristol, RFC 2109, HTTP State Management Mechanism, Feb. 1997, pp. 1-21.
Co-pending U.S. Appl. No. 09/769,635; entitled "Method and System for Providing Interactive Telephony Sessions," filed Jan. 24, 2001; Cafarella et al; 46 pages.

* cited by examiner

*Primary Examiner*—Creighton Smith
*Assistant Examiner*—Joseph T Phan
(74) *Attorney, Agent, or Firm*—Perkins Coie LLP

(57) ABSTRACT

A method and apparatus for scalable handling of communications with varying numbers of participants over a telephone interface is described. The approach treats the different participants recorded communications as part of a larger asynchronous communication and provides a serializing (voice) user interface for participating in the conversation. This can be used to provide services ranging from phone-based discussion boards to more orderly teleconferences. Features may include moderation of comments, automatic removal of comments, and/or other features tailored to the specific use of the serializing approach.

10 Claims, 4 Drawing Sheets

SERIALIZING AN ASYNCHRONOUS COMMUNICATION

BACKGROUND OF THE INVENTION

1. Field of the Invention

This invention relates to the field of phone based communications. In particular, the invention relates to methods for providing serialized discussions from an asynchronous communication session.

2. Description of the Related Art

Conference calls (and chat lines) have previously allowed multiple participants into a single communication over the phone. On a conference call there are issues with people over-talking one another (e.g. if one person is talking the others must listen), there is minimal ability to review the communication after the fact, and the conversation must take place in real time. Thus if there is only one person in a particular call then that person will be quite bored—only able to talk to herself/himself Similarly, if there are 100 people in a particular call almost no (meaningful) communication will be possible.

Accordingly, what is needed is a method and apparatus for handling an arbitrary number of users in a communication over a telephone interface by providing serialization of the asynchronous communication.

SUMMARY OF THE INVENTION

Figure 1:
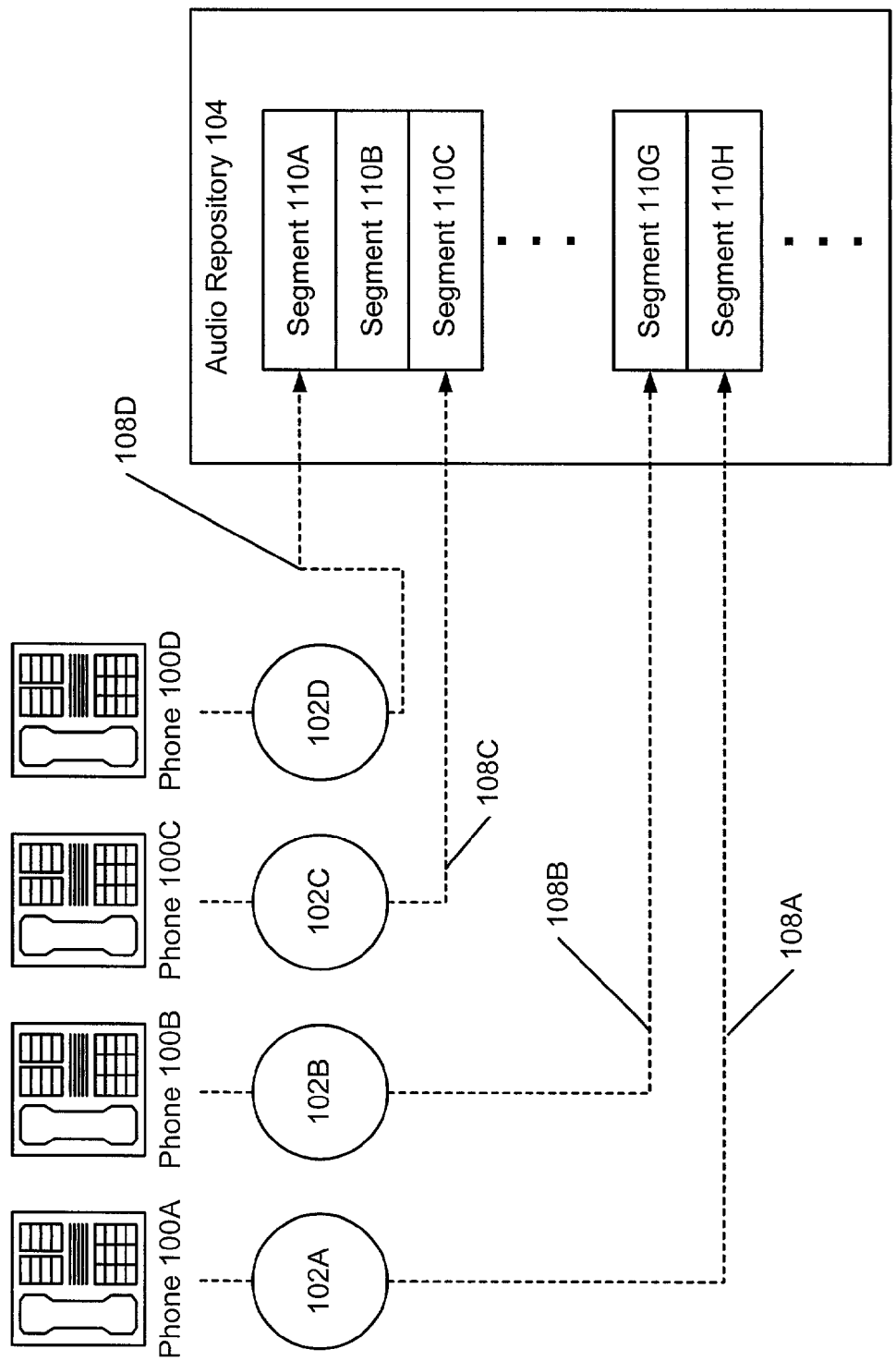
FIG. 1 illustrates a logical view of participants in the serialized communication.

A method and apparatus for scalable handling of communications with varying numbers of participants over a telephone interface is described. The approach treats the different participants' recorded communications as part of a larger asynchronous communication and provides a serializing (voice) user interface for participating in the conversation. This can be used to provide services ranging from phone-based discussion boards to more orderly teleconferences. Features may include moderation of comments, automatic removal of comments, and/or other features tailored to the specific use of the serializing approach.

DETAILED DESCRIPTION

A. Introduction

A method and apparatus for serializing an asynchronous communication is described. This approach can be used for a number of straightforward purposes from controlled phone conferencing to providing phone based chat lines that easily scale from few to hundreds, or even thousands, of concurrent users. For example, in one embodiment of the invention, the approach is used to support a call for stock analysts. In another embodiment of the invention, the approach is used to support voice discussions about stocks and/or traffic information. End users of method and apparatus can use telephones, including wireless telephones, to participate in the asynchronous communication.

The invention will be described in greater detail as follows. First, a number of definitions useful to understanding the invention are presented. Then, a presentation of the logical model for serializing the asynchronous communication is presented. Next, the basic architecture for a phone application platform supporting the method is presented. Finally, the processes and features are presented in greater detail.

B. Definitions

1. Telephone Identifying Information

For the purposes of this application, the term telephone identifying information will be used to refer to ANI (automatic numbering identification) information, CID (caller identification) information, and/or some other technique for automatically identifying the source of a call and/or other call setup information. For example, telephone identifying information may include a dialed number identification service (DNIS). Similarly, CID information may include text data including the subscriber's name and/or address, e.g. "Jane Doe". Other examples of telephone identifying information might include the type of calling phone, e.g. wireless, pay phone, and/or hospital phone. Additionally, the telephone identifying information may include wireless carrier specific identifying information, e.g. location of wireless phone now, etc. Also, signaling system seven (SS7) information may be included in the telephone identifying information.

2. User Profile

A user profile is a collection of information about a particular user. The user profile typically includes collections of different information of relevance to the user, e.g., account number, name, contact information, user-id, default preferences, and the like. Notably, the user profile contains a combination of explicitly made selections and implicitly made selections.

Explicitly made selections in the user profile stem from requests by the user to the system. For example, the user might add business news to the main topic list. Typically, explicit selections come in the form of a voice, or touch-tone command, to save a particular location, e.g. "Remember this", "Bookmark it", "shortcut this", pound (#) key touch-tone, etc., or through adjustments to the user profile made through the web interface using a computer.

Additionally, the user profile provides a useful mechanism for associating telephone identifying information with a single user, or entity. For example, Jane Doe may have a home phone, a work phone, a cell phone, and/or some other telephones. Suitable telephone identifying information for each of those phones can be associated in a single profile for Jane. This allows the system to provide uniformity of customization to a single user, irrespective of where they are calling from.

In contrast, implicit selections come about through the conduct and behavior of the user. For example, if the user repeatedly asks for the weather in Palo Alto, Calif., the system may automatically provide the Palo Alto weather report without further prompting. In other embodiments, the user may be prompted to confirm the system's implicit choice, e.g. the system might prompt the user "Would you like me to include Palo Alto in the standard weather report from now on?"

Additionally, the system may allow the user to customize the system to meet her/his needs better. For example, the user may be allowed to control the verbosity of prompts, the dialect used, and/or other settings for the system. These customizations can be made either explicitly or implicitly. For example if the user is providing commands before most prompts are finished, the system could recognize that a less verbose set of prompts is needed and implicitly set the user's prompting preference to briefer prompts.

3. Topics and Content

A topic is any collection of similar content. Topics may be arranged hierarchically as well. For example, a topic might be business news, while subtopics might include stock quotes, market report, and analyst reports. Within a topic different types of content are available. For example, in the stock quotes subtopic, the content might include stock quotes. The distinction between topics and the content within the topics is primarily one of degree in that each topic, or subtopic, will usually contain several pieces of content.

4. Demographic and Psychographic Profiles

Both demographic profiles and psychographic profiles contain information relating to a user. Demographic profiles typically include factual information, e.g. age, gender, marital status, income, etc. Psychographic profiles typically include information about behaviors, e.g. fun loving, analytical, compassionate, fast reader, slow reader, etc. As used in this application, the term demographic profile will be used to refer to both demographic and psychographic profiles.

5. Cookie

The term cookie, as used herein, refers to a structured data element formatted according to the general principles of IETF RFC 2109 and/or some other state management standard. A brief review of RFC 2109 may be useful. The core structure of a cookie is a name-value pair. The name is a token for identifying the cookie, e.g. "Customer", and the value is the value of that corresponding token, e.g. "Jane Doe". Implicitly, each cookie is associated with the sending domain. According to RFC 2109, the implicitly set domain is the originating domain to which the HTTP request was sent. For example, if an HTTP GET request is sent to the request host "www.example.com", then the cookie set in response to that request would be implicitly associated with "www.example.com"

Additionally, a number of optional fields can be set, for example: a different domain for which the cookie is valid (Domain); a time to live (Max-Age); a version string (Version); etc. The phrases in parenthesis correspond to the RFC 2109 standard field names for the options.

C. Logical Model for Serializing an Asynchronous Communication

A logical model for understanding the method of serializing an asynchronous communication will be presented with reference to FIG. 1 which illustrates a logical view of participants in the serialized communication. It is easier to understand the logical model if a particular example is selected.

The example we will use is a feature of a voice portal that allows users to discuss their thoughts on particular equity issues, colloquially: stocks. This feature would typically be associated with a stock quote type feature of the type available through the TELLME™ consumer service at +1 (800) 555-TELL™. It will be assumed that the asynchronous communication concerns the stock of WidgetCo, a fictitious company. Here is a sample dialogue that might lead a user to discover these communications features:

System: Hi there, welcome to Tellme . . .
User: Stock Quotes
System: Welcome to Tellme Stock Quotes, brought to you by <sponsor> . . .
User: WidgetCo
System: WidgetCo down five-eighths to forty-seven and a half . . .
System: Say 'Message Boards' to discuss WidgetCo stock with other users.
User: Message Boards This brings us to the situation of FIG. 1. In the example of FIG. 1, there are four telephones (100 A-D) coupled in communication with respective program execution threads (102 A-D). Each thread of execution has a respective pointer (108 A-D) to a place in an audio repository 104, the audio repository 104 including a plurality of (recorded audio) segments (110A-H).

Since our user just joined the communication we will assume she is the "last" phone in the picture, 100D. Notice that her program execution thread 102D has a pointer 108D to the earliest available segment 110A. (See below for a discussion of segment aging, starting positions and other details.) In contrast some of the other users (as represented by their phones) are listening to later points in the conversation as seen by their respective pointers to (chronologically) later recorded segments.

These recorded audio segments 110A-H correspond to the communication, each is a recorded message from one or more users (possibly even users that are no longer currently coupled in communication to the system by telephone). For example, the segment 110A was recorded by a user no longer connected to the system. Here is a hypothetical transcription of the audio segments:

Segment 110A (user no longer still on phone): WidgetCo will easily make street estimates of sixty-cents a share.
Segment 110B (an earlier recorded segment whose user happens to still be connected via one of the phones 100A-D): I disagree with that, their Q4 balance sheet was hiding some nasty surprises.
Segment 110C (another user no longer on phone): Ditto, I think thirty cents a share will be lucky. . . .

As this example shows, users can also record messages from within their thread of execution. Those messages are then appended to the end of the queue. For example, if as our example user of phone 100D listened to segment 110A, she vehemently disagreed she could immediately respond, e.g.:

System: (playing back segment 110A to phone 100D in program execution thread 102D) . . .
User: (interrupting) Respond
System: Please record your response, when you are done press the pound key.
User: (records message and hits #)
System: (optionally confirms or allows re-recording) (optionally estimates amount of time till a new caller will hear the message in the queue) (Allows user to control resumption of playback either where she left off, mid-segment, or at other points, e.g. resume, restart, next, previous, etc.)

The recorded message from phone 100D would, in this embodiment, be placed at the end of the queue, e.g. as segment 110I. That would mean that if the user of phone 100A finished the segment 110H she would be the first to hear the new comment in segment 110I, because in one embodiment users are automatically stepped through the queue in chronological order based on the time of the recording (oldest to newest). Having presented the basic logical model for serializing an asynchronous communication, the basic architecture for supporting such a method and apparatus will now be described in greater detail.

D. Architecture

Figure 2:
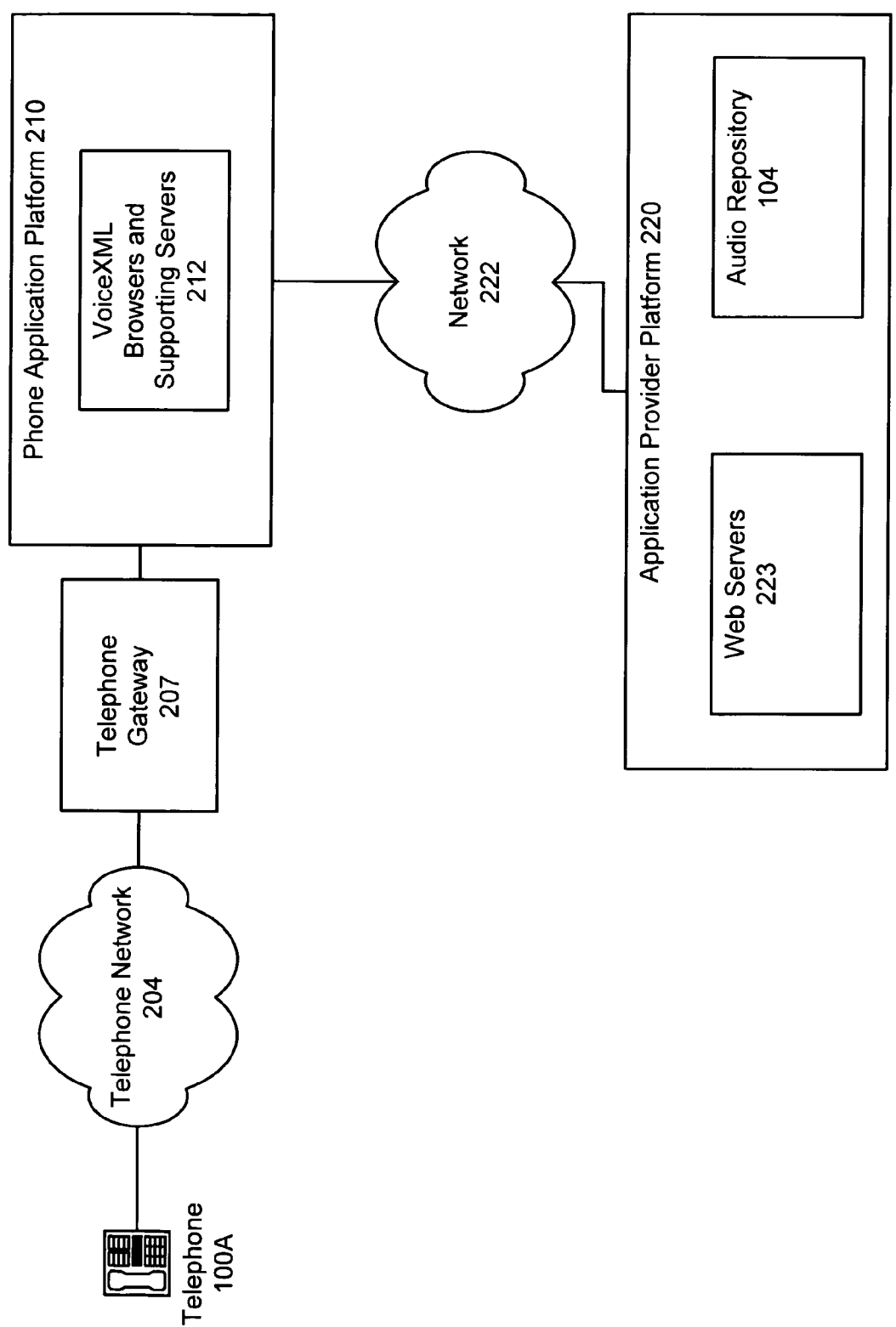
FIG. 2 illustrates the components of a phone application platform supporting the serialized communication.

First, the hardware and software architecture of a system including an embodiment of the invention will be described with reference to FIGS. 2. FIG. 2 illustrates a system including embodiments of the invention used to support phone applications, including the asynchronous communication application. The system of FIG. 2 can be used to allow deployment of phone applications without the need for specialized hardware and/or software.

The following lists the elements of FIG. 2 and describes their interconnections. FIG. 2 includes the telephone 100A, a telephone network 204, a telephone gateway 207, a phone application platform 210, VoiceXML browsers and supporting servers 212, a network 222, an application provider platform 220, web servers 223, and the audio repository 104. The telephone 100A is coupled in communication with the telephone network 204. The telephone network 204 is coupled in communication with the telephone gateway 207. The telephone gateway 207 is coupled in communication with the phone application platform 210. The network 222 is coupled in communication with the phone application platform 210 and the application provider platform 220.

The following describes each of the elements of FIG. 2 in greater detail. The telephone 100A is a telephone interface to the phone application platform 210. The telephone 100A may be any sort of telephone and/or wireless telephone. For example the telephone 100A may be a land line phone, a PBX telephone, a satellite phone, a wireless telephone, and/or any other type of communication device capable of providing voice communication and/or touch-tone signals over the telephone network 204. However, any audio signal carrying interface could be used.

The telephone network 204 may be the public switched telephone network (PSTN) and/or some other type of telephone network. For example, some embodiments of the invention may allow users with a voice over Internet Protocol (IP) phone to access the phone application platform 210. The telephone network 204 is coupled to the telephone gateway 207 that allows voice communications and/or touch-tone signals from the telephone network 204 to reach the phone application platform 210 in usable form. Similarly, the telephone gateway 207 allows audio signals generated by the phone application platform 210 to be sent over the telephone network 204 to respective telephones, e.g. the telephone 100A. The telephone network 204 generally represents an audio signal carrying network.

The phone application platform 210 is comprised of one or more computers providing the VoiceXML browsers and supporting servers 212. (In this embodiment, VoiceXML is one of the implementation languages.) The particular configuration shown is designed support outsourced, or hosted, telephony provisioning as seen by the separation of the application provider platform 220 from the phone application platform 210. This allows the phone services to be provided by a different legal entity than the application. The implementation can be stored for access to the program via the web servers 223 using the HTTP protocol over the network 222 (the network 222 can be the Internet, a private network an extranet, a virtual private network, or more generally any data carrying network). Similarly, the audio segments in the audio repository 104 can be accessed across the network using one or more protocols, e.g., HTTP, a streaming media protocol (e.g., Real Audio™), etc. A more detailed description of one possible embodiment of the phone application platform 210 and features for working with audio content see U.S. Pat. No. 6,970,915 entitled "Streaming Content Over a Telephone Interface," having inventors Hadi Partovi, et al., and assigned to the assignee of the current application.

Having described the basic architecture and some details, we now turn to implementation and other features in greater detail.

E. Implementation

Figure 3:
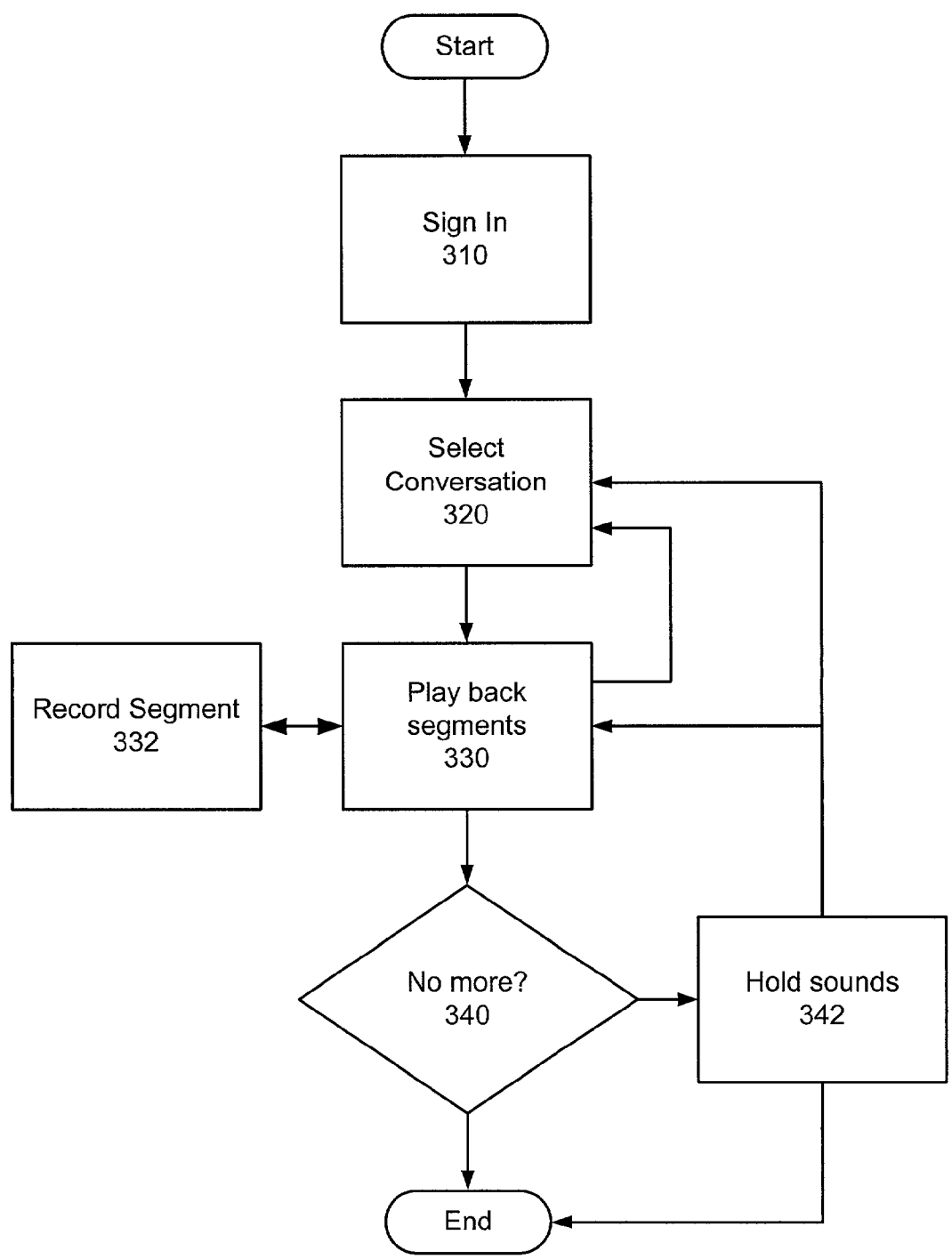
FIG. 3 is a process flow diagram for participating in a serialized asynchronous communication.

The implementation will be described with reference to the process flow diagram of FIG. 3 which illustrates how a user can participate in a serialized asynchronous communication. Returning briefly to the logical view of FIG. 1, the program execution threads 102A-D loosely correspond to the state associated with the running applications (both VoiceXML and otherwise) on the phone application platform 210 and the application provider platform 220.

The process starts at step 310 with sign in. This step may be completely omitted, or delayed, in particular embodiments. For example, if this is offered as a free feature then sign-ins may be unnecessary. In other embodiments, sign in is only required to access certain specified features, e.g. record a segment or set special options. In some embodiments, telephone identifying information is used to provide automatic sign-in without explicit user confirmation. As this process flow diagram suggests, there may be multiple conversations (each with a respective audio repository 104 or with the segments within the audio repository 104 appropriately partitioned into conversations.)

Next, at step 320, the user can select a conversation to participate in. This may be automatically set, e.g. see example above where the conversation was selected implicitly/automatically because the user was in the stock board for WidgetCo. In some embodiments only a single conversation is supported. In one embodiment, each conversation is assigned a (unique) number which can be manually entered by the user using DTMF or spoken voice commands. In another embodiment, each conversation is assigned a (unique) name which can be used by the user to access the conversation, e.g. by speaking the name. Additionally, if necessary there can be authentication for access to a particular conversation, e.g. based on user sign in, password, and/or some other mechanism. In still other embodiments, the conversation is selected automatically based on telephone identifying information, e.g. dialed number identifies the conversation.

From a user perspective the meat of the process occurs next, at step 330, as segments from the conversation are played back, frequently in chronological order from oldest to most recent. The process can go a number of directions at step 330, the user can issue commands to:

1. control play back (stay on step 330, but within same or different segment)
 2. record a response/segment (transition to step 332, and then back to 330)
 3. change rooms (transition to step 320)
 4. exit (transition out of FIG. 3)
 5. if there are no more messages (step 340) then either the user may exit out or be taken to hold sounds (step 342)

Each of these options will now be considered and explained in greater detail. Play back controls are the most straight-forward and may include commands for speeding or slowing the speed of playback (e.g. faster pace playback of segment at 1.5× recording speed), positioning within a segment (e.g., forward fast, rewind, etc.) and adjusting which segment is heard (e.g., skip ahead/back in audio repository). Typically, each of these commands may be associated with one or more DTMF inputs as well as one or more spoken word commands. In one embodiment, all segments are played back after use of a software program from Enounce Corporation, Palo Alto, Calif., <http://www.enounce.com/>, that shortens segments by reducing pauses between words and speeds the segment up without causing significant distortion.

Exiting the asynchronous communication is easily accomplished by providing an appropriate spoken or DTMF command, e.g. "exit", "menu", "goodbye", etc.

If a user reaches the end of the audio repository (no segments in ordinary playback order left to hear) then either hold sounds (step 342) are played or the process may terminate. The hold sounds may be music and/or any other sounds including help information and prompting for commands. If new messages arrive, in one embodiment, playback resumes automatically at step 330.

Whenever the user is listening to a segment (or after) she/he can reply to it. The basic approach is to transition to step 332 and accept audio input from the user (typically terminated with silence or a predetermined DTMF key press, e.g. pound) and then confirm the input before adding the segment.

This concludes the basic discussion of the features now it is helpful to talk about how this is scalable from one or two to hundreds of users as well as some advanced and alternative features.

Up until this point, the discussion has focused on what was assumed to be an ever-increasing audio repository for a conversation. However, scalability for handling both large and small volume conversations comes from purging (typically) older messages to maintain a certain relative overall audio repository/queue depth. Turning back to FIG. 1, this would mean removing segment 110A (from the playback queue) after there were enough later entries. This queue shortening can be selectively applied on a per-conversation basis. Storage space permitting, it is not necessary to actually remove the recorded audio segment from the repository, just removing them from access and playback at step 330 is sufficient.

The queue shortening can work in several ways:
remove segments left before a predetermined time (irrespective of queue size; useful for dated information, e.g. traffic conversation might get cleared if older than 24 hours; or a "chat"-style conversation where all items only last a predetermined amount of time, e.g. one hour.)
remove segments after there are enough subsequent audio segments to allow X additional minutes of participation in the conversation (this would mean that after, say 10 additional minutes worth of segments are recorded an earlier segment is removed; this helps control telecomm costs—especially useful in a free/low cost offerings)

These strategies are particularly well suited to handling both large volume and small volume conversations. For example, in a traffic related conversation, old information is of little use; however, the number of messages is somewhat less important. In contrast, for a heavy use conversation (e.g. about a popular stock or other topic), controlling queue length is important. The queue shortening techniques should balance controlling length against keeping a long enough queue (even of older segments) that callers can hear something even if there are not many current callers.

A slightly different approach is to switch the playback order, e.g. start at most recent and go to the oldest. Still other approaches are possible and may be adapted to the nature and purpose of a particular conversation. Also, multiple approaches can be applied to a single conversation in combination.

Other advanced features may include direct response to participants who recorded particular segments. In this embodiment sign ins (see step 310) would typically be used or (optionally) requested at message record time (within voice user interface of step 332). For example, after recording a segment the user might be prompted, "Would you like to receive direct responses to your segment, say yes or no." For this example the relevant recorded segment is the segment 110A, recorded by a user of the phone 100A and the user requested direct responses.

Thus, when segment 110A is played back and another user hears the message the system may allow for a number of straightforward options: (1) record as normal and just forward the response to the message recorder; (2) provide different commands for public-vs-private responses, e.g. "Record" vs. "Private Message"; and/or combinations of these options. The specific manner in which the response is provided back to the message originator will now be discussed.

In one embodiment, certain users are allocated voicemail boxes to receive responses. In that case, the user can (without needing to reveal their personal phone number, or even their voicemail box number, to a responder) receive the responses in their voicemail. In one embodiment, having a voicemail box is a paid service available only to users who pay to access the services.

In other embodiments, the user can request outbound call notifications with the content of the reply. This could use the approach described in U.S. patent application Ser. No. 09/769,635, entitled "Method and System for Providing Interactive Telephony Sessions," having inventors Michael J. Cafarella et al., filed Jan. 24, 2001. In this configuration, the user leaving a voice segment would (possibly implicitly from their sign-in) provide a calling number where they could be reached and after responses are recorded they would automatically be notified. On or more user interfaces (voice, web) may be provided to allow users to control notification times and numbers tried.

Some embodiments support both voicemail and outbound notification and the choice is selectable by users as they leave their recorded messages.

The queue segment feature also can be used as a type of moderation device. The simplest configuration of this is that a segment in the audio repository 104 is not played back to callers (during the process of FIG. 3) until it is marked as approved. In one embodiment, one or more users (by way of their sign in) are identified as moderators and provided access to the (as yet) unapproved segments during the process of FIG. 3. After hearing a segment, the moderates can approve or disapprove the segment.

Similarly, in some embodiments, participants may be permitted to rate comments, e.g. 1-10 and off-topic. This could be used for small surveys but also to judge the popularity of a proposal or position without the need for a separate "polling"-type application.

Figure 4:
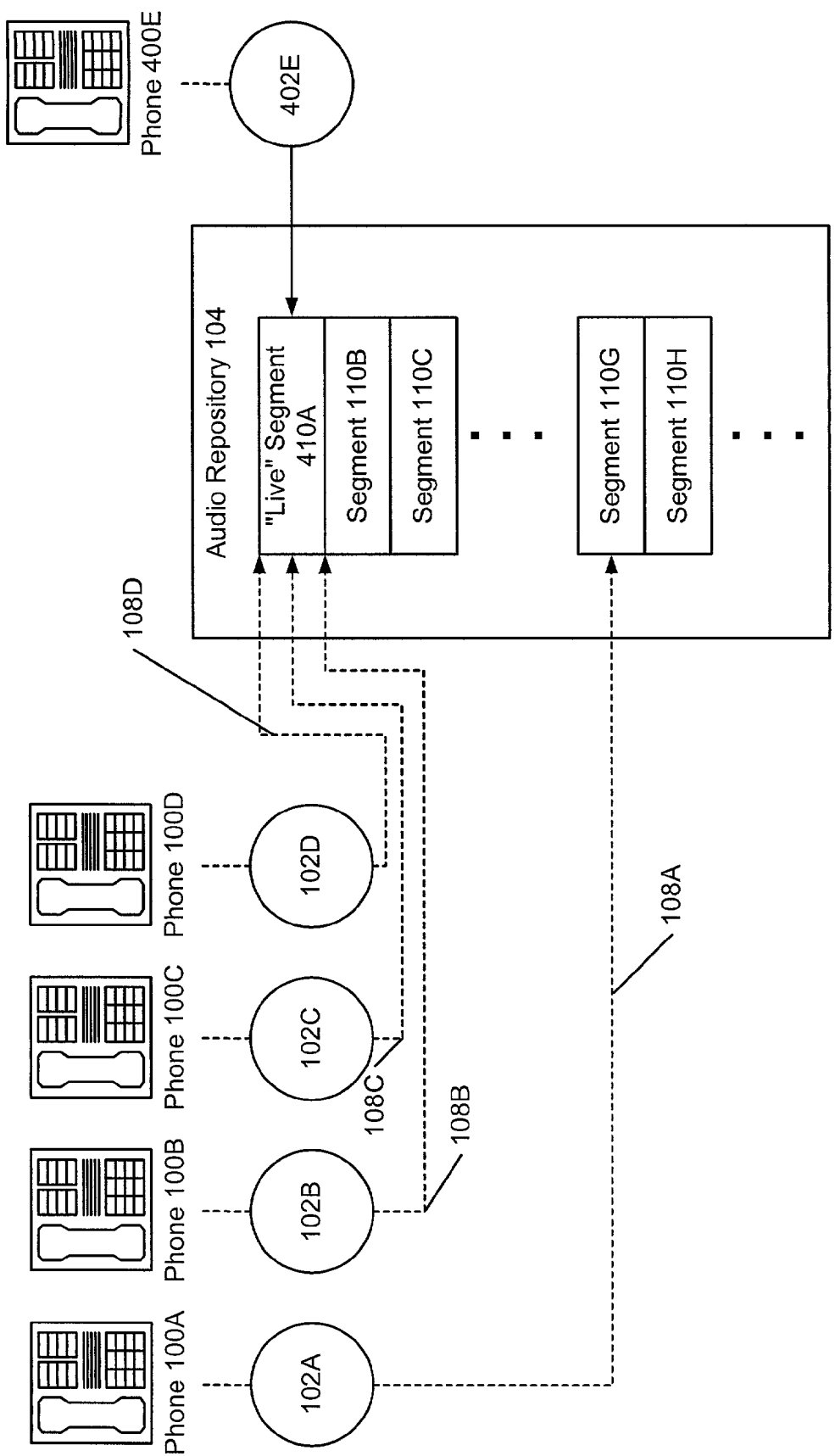
FIG. 4 illustrates a logical view of participants in a conference-call style serialized asynchronous communication.

A more complicated example showing moderation and the serialized asynchronous communication model will now be presented with reference to FIG. 4. Additionally, this discussion will focus on the possibility of providing access to one or more "live" recorded audio segments in the sense that at least one segment is not fully recorded at the time access by others is allowed. FIG. 4 illustrates a logical view of participants in a conference-call style serialized asynchronous communication. To flesh out the example, the phone 400E is being used by the discussion leader. In an analyst-style conference call this might be the CFO, CEO, etc. In this example, the analysts are called in on phones 100B-D and, an assistant to the company (possibly physically located near the users of the phone 400E) is reviewing analyst questions as the live portion is ongoing.

The live segment 410A is the audio (possibly not completely recorded at a particular time) from the conference call. For example, if the call starts at nine and ends up lasting till 10, then at 9:05 the live segment 410A will only be partially recorded. However, the next day, the live segment 410A would be complete, etc.

As FIG. 4 suggests, the analysts on phones 100B-D are listening to the presentation. The time-delay may depend on system load, but may also be live streaming. Because the analysts are listening to the streamed audio segment they can however pause, go back, or jump to the current front of the stream if they paused and want to pick up at what is being said now. Similarly, as analysts have questions they can say "Record", or similar, and leave their question. They can then either return to where they were in the stream or to the current front.

Meanwhile, the assistant using the phone 100A can review questions as they come in. This can allow them to be moderated, e.g. to remove objectionable and duplicative material, to reorder the repository to place questions in rank order of important, and/or to provide the party placing the call (out of band) hints, e.g. by writing notes on a piece of paper, sending an Instant Message or email, or whispering in the other person's ear. For example if as the CFO is delivering the financials there are seven questions about an obscure line item, then the assistant could whisper "Hey, say something about that tax credit", etc.

Handling of questions could then occur in a number of different possible fashions depending on the implementation preferences of the company and the style of dialogue preferred. In one embodiment, the remainder of the conference call occurs as described above with the CFO wading through the questions (segments 110B-110H) and providing responses with those responses added as later segments. In one embodiment, the audio of a segment can be included as part of a response segment so that for example the audio of segment 110B could be included in the segment 110I (not shown) when the CFO responds to 110B. Note that if direct response to sender is enabled then the analyst could hang up and get her response without having to hold for hours.

In another embodiment, the person running the conference call (e.g. the CFO) presses a predetermined sequence (e.g. DTMF pound key) to terminate the initial live segment 410A. At that point the next approved segment, e.g. the segment 110B, is treated as a logical part of the stream for callers with them advancing to the segment 110B seamlessly. When the segment 110B finishes playing another live segment can be automatically started for the CFO, e.g. the call leader. That new live segment would then be heard by the analysts (on phones 100B-D) before they would hear the next question (in segment 110C). In simulated "live" variant, the analysts are not able to skip-ahead past the point in the conversation where the call leader is responding, e.g. to hear the questions or additional comments in segments 110C-H. However, after the whole call is over, e.g. call leader says we need to wrap this up, the entire collection of segments can be treated as described more generally above in connection with FIGS. 1 and 3.

This latter approach is particularly interesting in that it allows a high degree of moderation (in this example one assistant was used, but there could be multiple) and also allows analysts to be called back with the answers to their questions. Additionally, later on, analysts could leave follow ups to answers, etc.

There are a number of different models for financially supporting provision of these services. The most basic is an advertising supported model. In this configuration, users may be presented with ads prior to, during and after the process of FIG. 3 to help compensate the service provider. Other mechanisms include per-minute charges (either to credit card, phone bill, cash payment methods, etc.) and/or buffet style pricing at a flat amount per period of time. In one embodiment, even the paid service includes a limited amount of advertising. Other configurations may be totally user supported, e.g. conference call substitute type features of FIG. 4 with costs based on number of minutes and/or number of participants. Additional features call outbound notifications and voicemail may be separately charged, e.g. $1.00 to get a call back, etc.

F. CONCLUSION

In some embodiments, processes and apparatus of FIGS. 1-4 can be implemented using hardware based approaches, software based approaches, and/or a combination of the two. In some embodiments, the serialization of asynchronous communications uses one or more computer programs that are included in one or more computer usable media such as CD-ROMs, floppy disks, or other media. In some embodiments, an execution thread, are included in one or more computer usable media.

Some embodiments of the invention are included in an electromagnetic wave form. The electromagnetic waveform comprises information such as transcription generation programs, script handling programs, phonemic variation generation programs, script handling programs, and/or syllabication programs. The electromagnetic waveform may include the programs accessed over a network.

The foregoing description of various embodiments of the invention has been presented for purposes of illustration and description. It is not intended to limit the invention to the precise forms disclosed. Many modifications and equivalent arrangements will be apparent.

What is claimed is:

1. A method, comprising:
   receiving a plurality of recorded first audio segments related to a first topic or issue, wherein each audio segment of the first audio segments comprises audio data recorded over different periods of time;
   receiving a plurality of recorded second audio segments related to a second topic or issue, wherein each audio segment of the second audio segments comprises audio data recorded over different periods of time and wherein the second topic or issue is different from the first topic or issue;
   dividing an audio repository into multiple partitions;
   storing the plurality of first audio segments in a first partition of the multiple partitions;
   assigning a first unique identifier to the plurality of first audio segments;
   storing the plurality of second audio segments in a second partition of the multiple partitions;
   assigning a second unique identifier to the plurality of second audio segments;
   receiving the first unique identifier in association with a first telephone call and at least one first command;

selectively playing back one or more of the first audio segments based on receipt of the first unique identifier and based on the at least one first command received via the first telephone call;

receiving the second unique identifier in association with a second telephone call and at least one second command; and selectively playing back one or more of the second audio segments based on receipt of the second unique identifier and based on the at least one second command.

2. The method of claim 1, wherein receiving the first unique identifier comprises receiving a number manually entered using DTMF by a user initiating the first telephone call.

3. The method of claim 1, wherein receiving the first unique identifier comprises receiving a number spoken via voice command by a user initiating with the first telephone call.

4. The method of claim 1, wherein receiving the first unique identifier comprises receiving a name spoken via voice command by a user initiating the first telephone call.

5. The method of claim 1, wherein receiving the first unique identifier comprises receiving a dialed number associated with the first telephone call.

6. The method of claim 1, further comprising:

after playing back the one or more of the first audio segments, receiving another command via the first telephone call to access the plurality of second audio segments; and selectively playing back one or more of the plurality of second audio segments based on the received other command.

7. The method of claim 1, further comprising:

receiving audio comments from a first user associated with the first telephone call; and storing the received audio comments in association with the first partition.

8. The method of claim 7, further comprising:

receiving a second telephone call; and receiving an audio reply from a second user that rates the stored audio comments.

9. A method, comprising:

receiving and storing a first series of recorded audio segments;

receiving and storing a second series of recorded audio segments;

receiving a request to access the stored first series of recorded audio segments via a first telephone call;

playing back the requested first series of recorded audio segments via the first telephone call;

receiving a selection of a first audio segment of the played back first series of recorded audio segments via the first telephone call;

receiving a recorded first audio comment via the first telephone call;

storing the received recorded first audio comment in association with the selected first audio segment;

receiving a request to access the second series of recorded audio segments via a second telephone call;

playing back the requested second series of recorded audio segments via the second telephone call;

receiving a selection of a first audio segment of the played back second series of recorded audio segments via the second telephone call;

receiving a recorded second audio comment via the second telephone call;

storing the received recorded second audio comment in association with the selected first audio segment.

10. The method of claim 9, further comprising:

receiving a selection of a second audio segment of the first series of recorded audio segments via the first telephone call;

receiving a recorded second audio comment via the first telephone call; and storing the received recorded second audio comment in association with the selected second audio segment.

* * * * *